United States Patent
Yang et al.

(10) Patent No.: US 8,957,653 B2
(45) Date of Patent: Feb. 17, 2015

(54) POWER CONTROL CIRCUIT AND LOOP ANALYZING APPARATUS COMPRISING SAME

(71) Applicant: ScienBiziP Consulting (Shen Zhen) Co., Ltd., Shenzhen (CN)

(72) Inventors: Fu-Sen Yang, Shenzhen (CN); Peng Chen, Shenzhen (CN); Song-Lin Tong, Shenzhen (CN)

(73) Assignee: ScienBiziP Consulting (Shen Zhen) Co., Ltd., Guangdong (CN)

( * ) Notice: Subject to any disclaimer, the term of this patent is extended or adjusted under 35 U.S.C. 154(b) by 201 days.

(21) Appl. No.: 13/730,817

(22) Filed: Dec. 28, 2012

(65) Prior Publication Data
US 2013/0241506 A1    Sep. 19, 2013

(30) Foreign Application Priority Data
Mar. 19, 2012    (CN) .......................... 2012 1 0072046

(51) Int. Cl.
*G05F 1/40* (2006.01)
*G05F 1/62* (2006.01)
(52) U.S. Cl.
CPC ........................................ *G05F 1/62* (2013.01)
USPC ...................................... 323/283; 363/21.08

(58) Field of Classification Search
USPC ......... 323/212, 222, 224, 268, 272, 282–288; 363/41, 95, 97, 98, 132, 21.06, 21.08
See application file for complete search history.

(56) References Cited

U.S. PATENT DOCUMENTS

| | | | | |
|---|---|---|---|---|
| 6,433,525 | B2 * | 8/2002 | Muratov et al. | 323/282 |
| 7,471,072 | B2 * | 12/2008 | Fogg et al. | 323/284 |
| 7,598,715 | B1 * | 10/2009 | Hariman et al. | 323/271 |
| 8,513,933 | B2 * | 8/2013 | Notman et al. | 323/284 |

\* cited by examiner

*Primary Examiner* — Rajnikant Patel
(74) *Attorney, Agent, or Firm* — Novak Druce Connolly Bove + Quigg LLP

(57) ABSTRACT

A power supply control circuit includes a main controller, a current detection unit electronically connected to the main controller, and a mode switch unit electronically connected to the main controller. The current detection unit cooperates with the main controller in detecting a value of an output current of a power supply circuit. The main controller determines whether the power supply circuit is operating in a discontinuous conduction mode or in a continuous conduction mode according to the value of the output current of the power supply circuit, and controls the mode switch unit to switch the power supply circuit to the continuous conduction mode when the power supply circuit operates in the discontinuous conduction mode.

14 Claims, 3 Drawing Sheets

POWER CONTROL CIRCUIT AND LOOP ANALYZING APPARATUS COMPRISING SAME

BACKGROUND

1. Technical Field

The exemplary disclosure generally relates to control circuits, and particularly to a power control circuit and a loop analyzing apparatus comprising the power control circuit.

2. Description of Related Art

A loop analyzer is used to obtain a Bode plot of a power supply circuit to test stability of the power supply circuit. The power supply circuit, such as a buck converter for example, works in different modes according to different loads on the circuit. For example, the power supply circuit operates in a discontinuous conduction mode (DCM) when the power supply circuit drives a light load. In the DCM, current through an inductor of the power supply circuit falls to zero during part of a charging and discharging cycle (that is, a commutation cycle) of the inductor. The power supply circuit operates in a continuous conduction mode (CCM) when the power supply circuit drives a heavy load. In the CCM, a current through an inductor of the power supply circuit never falls to zero during the commutation cycle of the inductor.

Since the current through the inductor of the power supply circuit falls to zero during part of the commutation cycle when the power supply circuit operates in the DCM, feedback signals output from the power supply circuit in response to testing signals from the loop analyzer are discontinuous. The loop analyzer may thus not be able to obtain a correct Bode plot of the power supply circuit when the power supply circuit drives a light load because of the discontinuous feedback signals.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
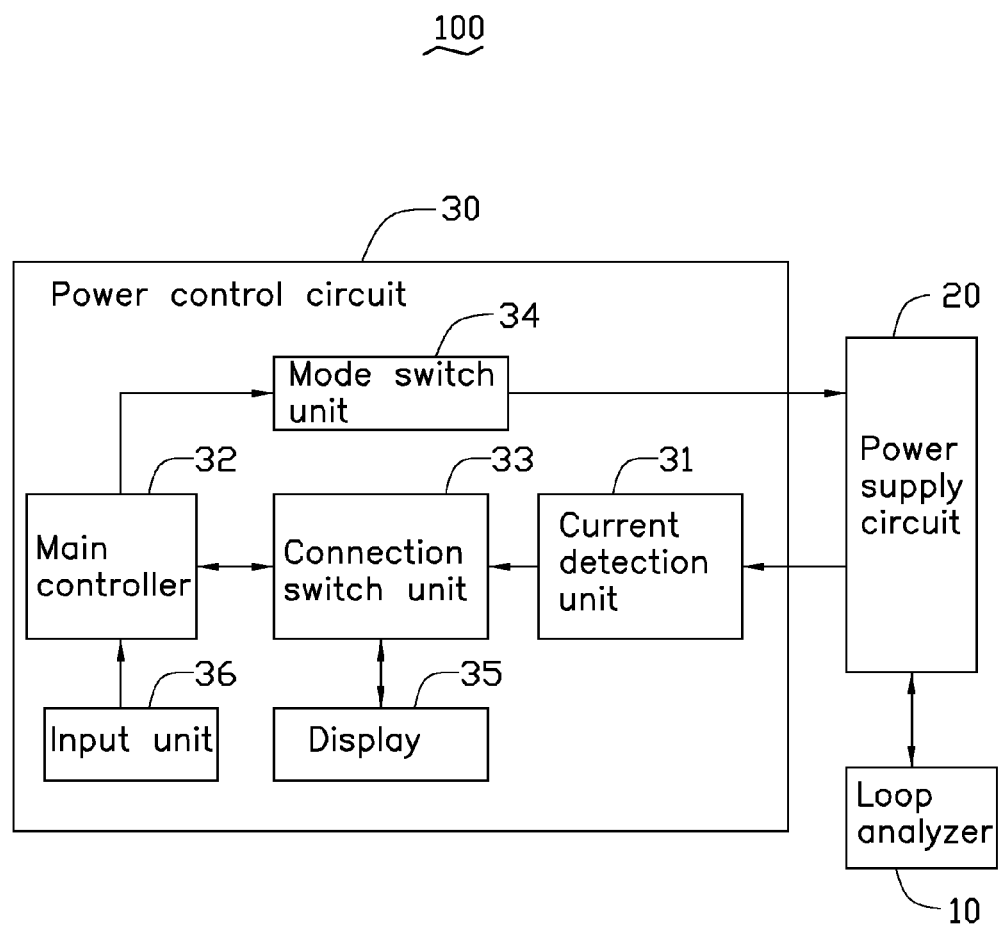
FIG. 1 shows a block diagram of an exemplary embodiment of a loop analyzing apparatus comprising a loop analyzer, a power supply circuit, and a power control circuit.

FIG. 1 shows a block diagram of an exemplary embodiment of a loop analyzing apparatus 100 comprising a loop analyzer 10, a power supply circuit 20, and a power control circuit 30. The loop analyzer 10 executes a loop test of the power supply circuit 20. The power control circuit 30 controls the power supply circuit 20 to operate in a CCM throughout the loop test.

Figure 2:
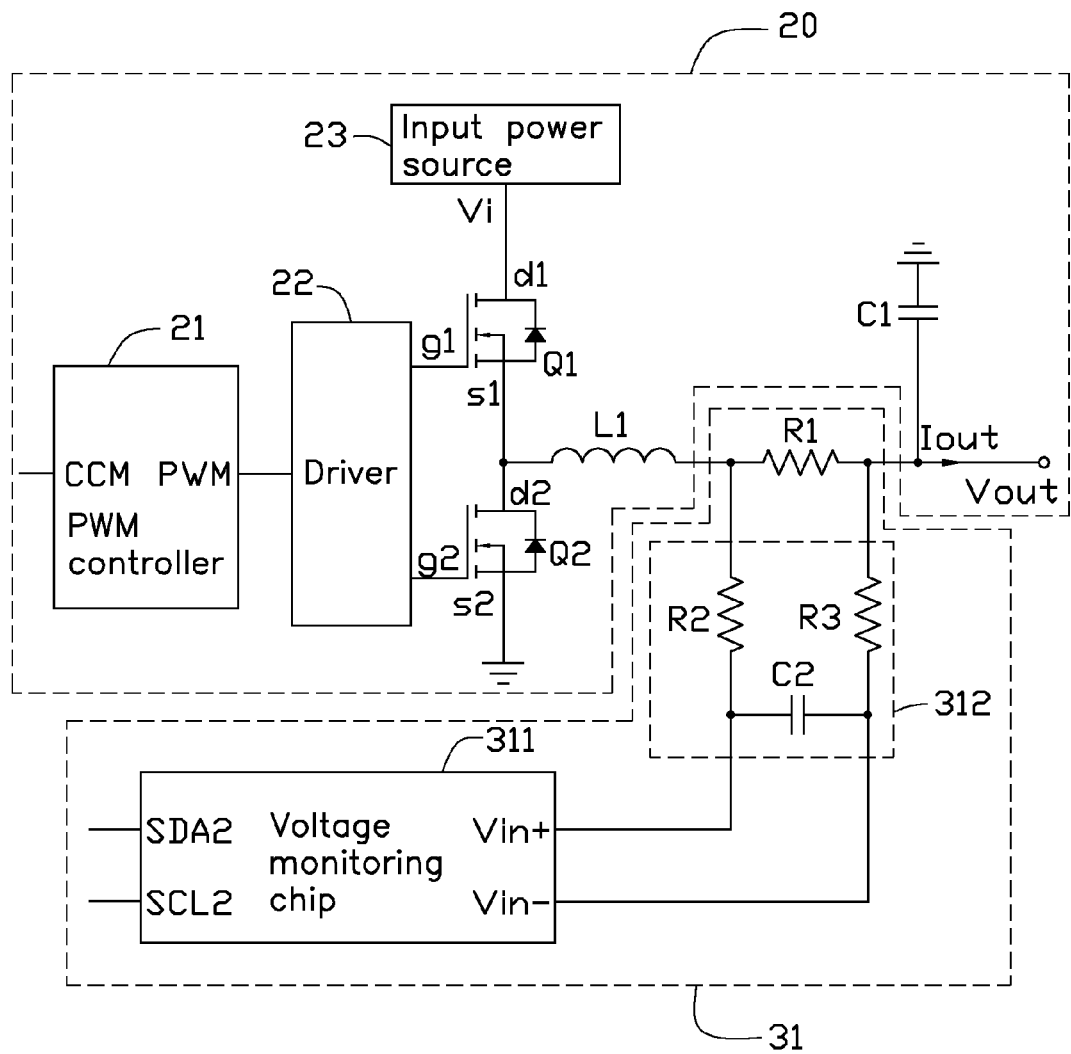
FIG. 2 and FIG. 3 cooperatively show a circuit diagram of the power supply circuit and the power control circuit shown in FIG. 1.
Figure 3:
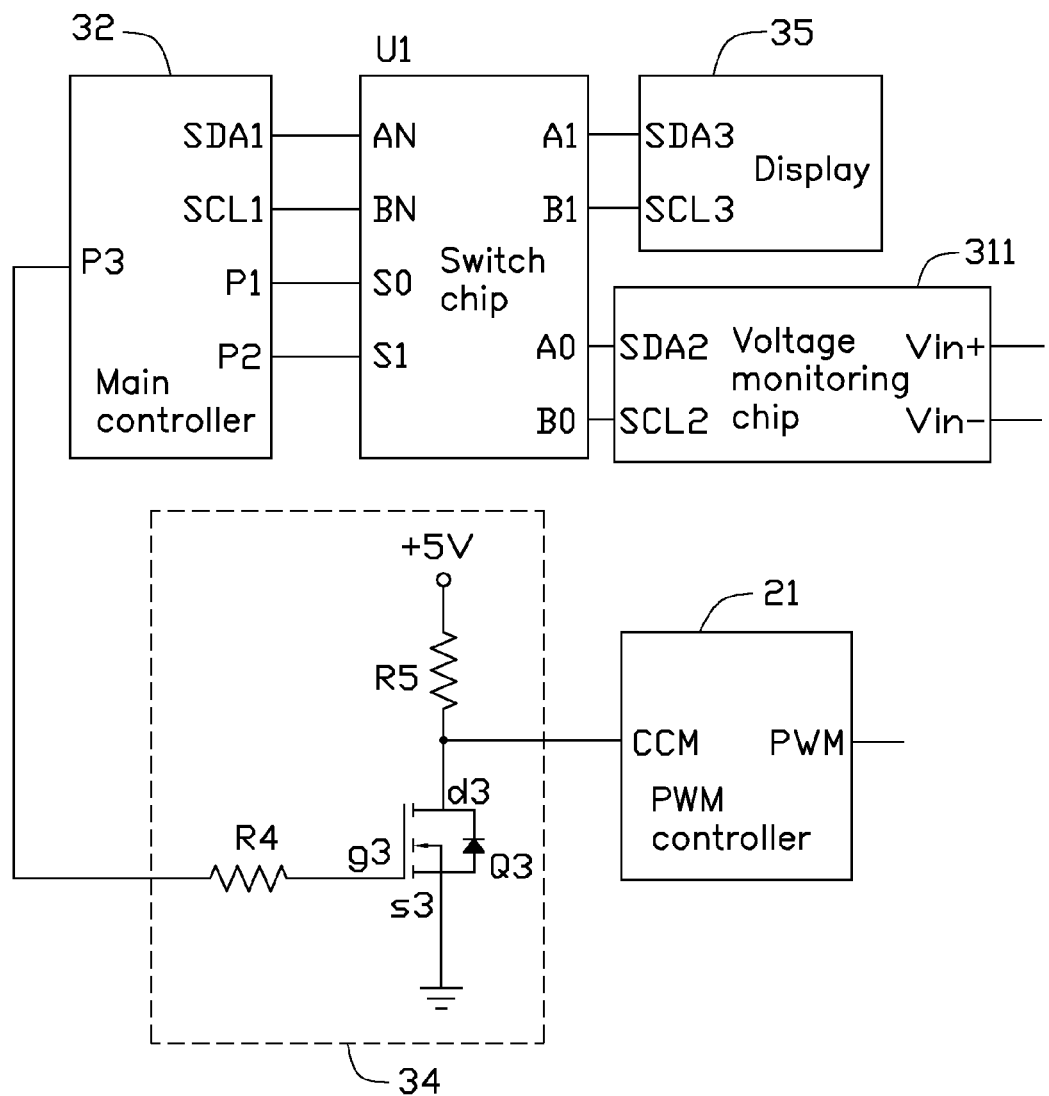

FIG. 2 and FIG. 3 cooperatively show a circuit diagram of the power supply circuit 20 and the power control circuit 30 shown in FIG. 1. In the exemplary embodiment, the power supply circuit 20 is a buck converter, which includes a pulse width modulation (PWM) controller 21, a driver 22, an input power source 23, a first metal-oxide-semiconductor field-effect transistor (MOSFET) Q1, a second MOSFET Q2, an inductor L1, and an output capacitor C1. The PWM controller 21 includes a control signal output pin PWM, and a mode switch pin CCM. The PWM controller 21 outputs a PWM signal to the driver 22 via the control signal output pin PWM. The current value of an output current Iout of the power supply circuit 20 is regulated by adjusting a duty cycle of the PWM signal. The PWM controller 21 switches work modes of the power supply circuit 20 according to the voltage level of the mode switch pin PWM. In one embodiment, the PWM controller 21 adjusts the duty cycle of the PWM signal to make the power supply circuit 20 operate in the CCM when the mode switch pin PWM is high (e.g., logic 1), and the PWM controller 21 adjusts the duty cycle of the PWM signal to make the power supply circuit 20 operate in a DCM when the mode switch pin PWM is low (e.g., logic 0).

The driver 22 is electronically connected to the control signal output pin PWM of the PWM controller 21. A gate g1 of the first MOSFET Q1 is electronically connected to the driver 22; a drain d1 of the first MOSFET Q1 is electronically connected to the input power source 23 to obtain an input voltage Vi. A gate g2 of the second MOSFET Q2 is electronically connected to the driver 22, a source s2 of the second MOSFET Q2 is grounded, and a drain d2 of the second MOSFET Q2 is electronically connected to the source s1 of the first MOSFET Q1. The inductor L1 is electronically connected in series with the output capacitor C1; the free terminal of the inductor L1 is electronically connected to the node between the drain d2 of the second MOSFET Q2 and the source s1 of the first MOSFET Q1, and the free terminal of the output capacitor C1 is grounded.

The driver 22 generates control signals in response to the received PWM signal and transmits control signals to the gates g1 and g2 of the first and second MOSFETs Q1 and Q2. The control signals control the first MOSFET Q1 and the second MOSFET Q2 to be alternately turned on and off. When the first MOSFET Q1 is turned on and the second MOSFET Q2 is turned off, the inductor L1 stores energy, and an output voltage Vout is supplied to a load (not shown) from the input power source 23 via the first MOSFET Q1 and the inductor L1. When the first MOSFET Q1 is turned off and the second MOSFET Q2 is turned on, the inductor L1 releases energy to take the place of the input power source 23 to supply the output voltage Vout to the load. Since a switching frequency of the first MOSFET Q1 and the second MOSFET Q2 is high, the output voltage Vout is approximately a direct voltage with a minimal alternative voltage component, and the output current is approximately a direct current with a minimal alternative current component. The output capacitor C1 is electronically connected in parallel with the load, and helps to smooth out the alternative current component as the inductor L1 charges and discharges in each cycle. When the power supply circuit 20 operates in the CCM, the output current Iout through the inductor L1 never falls to zero during the charging and discharging cycle of the inductor L1. Alternatively, when the power supply circuit 20 operates in the DCM, the output current Iout through the inductor L1 does fall to zero during part of the charging and discharging cycle of the inductor L1.

The power control circuit 30 includes a current detection unit 31, a main controller 32, a connection switch unit 33, a mode switch unit 34, a display 35, and an input unit 36.

The current detection unit 31 cooperates with the main controller 32 in detecting the output current Iout of the power supply circuit 20. The current detection unit 31 includes a voltage monitoring chip 311, a detection resistor R1, and a filtering unit 312. The detection resistor R1 is electronically connected between the inductor L1 and the output current C1. The voltage monitoring chip 311 includes a first voltage input pin Vin+, a second voltage input pin Vin−, a data pin SDA1 and a clock pin SCL1. The data pin SDA1 and the clock pin SCL1 are electronically connected to the main controller 32. The first voltage input pin Vin+ is electronically connected to a node between the inductor L1 and the detection resistor R1; the second voltage input pin Vin− is electronically connected to a node between the detection resistor R1 and the output capacitor C1.

The voltage monitoring chip 311 detects a voltage cross the detection resistor R1 via the first and second voltage detection pins Vin+ and Vin−, and outputs a corresponding digital voltage value to the main controller 32. The main controller 32 calculates the value of the output current Iout according to the resistance of the detection resistor R1 and the voltage value of the detection resistor R1. The main controller 32 further determines the work mode (CCM or DCM) of the power supply circuit 20 according to the value of the output current Iout, and displays the value of the output current Iout, and the determination as to work mode. In the exemplary embodiment, the main controller 32 compares the value of the output current Iout with a predetermined limited value. The predetermined limited value is inputted by using the input unit 36 (such as a keyboard electronically connected to the main controller 32, for example). The main controller 32 determines that the power supply circuit 20 is operating in the DCM when the value of the output current is lower than the predetermined limited value; otherwise, the main controller 32 determines that the power supply circuit 20 is operating in the CCM.

In one embodiment, the voltage monitoring chip 311 can be an INA219 type voltage monitoring chip, made by Texas Instruments (TI).

The filtering unit 312 filters signals from the first and second voltage input pins Vin+ and Vin−, and the detection resistor R1. The filtering unit 312 includes a filtering capacitor C2 and two filtering resistors R2 and R3. The filtering resistor R2 is electronically connected between the first voltage input pin Vin+ and the node between the inductor L1 and the detection resistor R2. The filtering resistor R3 is electronically connected between the second voltage input pin Vin− and the node between the detection resistor and the output capacitor C1. The filtering capacitor C2 is electronically connected between the first and second voltage input pins Vin+ and Vin−.

The main controller 32 includes a data pin SDA1, a clock pin SCL2, two selection pins P1 and P2, and a mode control pin P3. The connection switch unit 33 includes a switch chip U1. The switch chip U1 includes a first connection pin AN, a second connection pin BN, a third connection pin A0, a fourth connection pin B0, a fifth connection pin A1, a sixth connection pin B1, and two selection pins S0 and S1. The first and second connection pins AN, BN are electronically connected to the data pin SDA2 and the clock pin SCL2 of the main controller 32 respectively; the third and the fourth connection pins A0 and B0 are electronically connected to the data pin SDA1 and the clock pin SCL1 of the voltage monitoring chip 311 respectively; the fifth and the sixth connection pins A1 and B1 are electronically connected to a data pin SDA3 and a clock pin SCL3 of the display 35 respectively; and the selection pins S0 and S1 are electronically connected to the selection pins P1 and P2 of the main controller 32 respectively.

The main controller 32 can selectively connect to either the voltage monitoring chip 311 or to the display 35 by controlling the switch of the switch chip U1. For example, when the main controller 32 needs to connect to the voltage monitoring chip 311 to detect the value of the output current Iout, the main controller 32 sets the voltage levels of the selection pins S0 and S1 to low levels (logic 0,0), at this time, the switch chip U1 connects the first and second connection pins AN and BN to the third and fourth connection pins A0 and B0 respectively, such that the main controller 32 is electronically connected to the voltage monitoring chip 311. When the main controller 32 has detected the value of the output current Iout, and the value of the output current Iout needs to be displayed, the main controller 32 sets the voltage levels of the selection pins S0 and S1 to low level and high level (logic 0,1) respectively. At this time, the switch chip U1 connects the first and second connection pins AN and BN to the fifth and sixth pins A1 and B1 respectively, such that the main controller 32 is electronically connected to the display 35 via the switch chip U1.

The mode switch unit 34 includes an electronic switch, and two current limiting resistors R4 and R5. In the exemplary embodiment, the electronic switch is a MOSFET Q3. A gate g3 of the MOSFET Q3 is electronically connected to the mode control pin P3 of the main controller 32 via the current limiting resistor R4, a source s3 of the MOSFET Q3 is grounded, and a drain d3 of the MOSFET Q3 is electronically connected to a +5V power supply via the current limiting resistor R5. A node between the drain d3 and the current limiting resistor R5 is electronically connected to the mode switch pin CCM of the PWM controller 21.

When the main controller 21 detects that the power supply circuit 20 is operating in the DCM, the main controller 21 outputs a low level voltage signal (logic 0) to the MOSFET Q3, to switch off the MOSFET Q3. At this time, the mode switch pin CCM of the PWM controller 21 is high (logic 1), and thus the PWM controller 21 controls the power supply circuit 20 to switch into the CCM. When the loop test is finished, the main controller 32 outputs a high level voltage signal (logic 1) to switch on the MOSFET Q3, and the PWM controller 21 controls the power supply circuit 20 to return back to the DCM.

In use, the main controller 32 connects to the current detection unit 31 by controlling the switch of the switch chip U1. The main controller 32 detects the value of the output current Iout via the current detection circuit 20, and determines the work mode of the power supply circuit 20 according to the value of the output current Iout. Then the main controller 32 connects to the display 35 via the switch chip U1, to display the value of the output current Iout and the determination as to work mode. Simultaneously, if the main controller 32 determines that the power supply circuit 20 is operating in the DCM, the main controller 32 controls the mode switch unit 34 to switch the power supply circuit 20 to the CCM. After that, the loop analyzer 10 executes the loop test of the power supply circuit 20 and obtains a Bode plot of the power supply circuit 20. When the loop test is finished, the main controller 32 controls the power supply circuit 20 to return to the DCM. Therefore, the power control circuit 30 is thus able to control the power supply circuit 20 to operate in the CCM throughout the loop test even when driving a light load, to ensure that the loop analyzer 10 receives correct feedback signals from the power supply circuit 20, and a more precise test result is thus achieved.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A power supply control circuit, comprising:
a main controller;
a current detection unit electronically connected to the main controller, the current detection unit cooperating with the main controller in detecting a value of an output current of a power supply circuit; and
a mode switch unit electronically connected to the main controller;
wherein the main controller determines whether the power supply circuit is operating in a discontinuous conduction mode or in a continuous conduction mode according to the value of the output current of the power supply circuit, and controls the mode switch unit to switch the power supply circuit to the continuous conduction mode when the power supply circuit operates in the discontinuous conduction mode.

2. The power control circuit of claim 1, wherein the main controller compares the value of the output current of the power supply circuit with a predetermined limited value, the main controller determines that the power supply circuit operates in the discontinuous conduction mode when the value of the output current is lower than the predetermined limited value; and the main controller determines that the power supply circuit operates in the continuous conduction mode when the value of the output current is higher than the predetermined limited value.

3. The power control circuit of claim 2, further comprising an input unit electronically connected to the main controller, wherein the input unit inputs the predetermined limited value.

4. The power control circuit of claim 1, wherein the current detection unit comprises a detection resistor electronically connected to an output terminal of the power supply circuit, and a voltage monitoring chip electronically connected to two terminals of the detection resistor, the voltage monitoring chip detects a value of a voltage cross the detection resistor and outputs the value of the voltage across the detection resistor to the main controller, the main controller calculates the value of the output current according to the capacitance of the detection resistor and the value of the voltage across the detection resistor.

5. The power control circuit of claim 1, wherein the mode switch unit comprises a metal-oxide-semiconductor field-effect transistor (MOSFET) and a power source, a gate of the MOSFET is electronically connected to the main controller, a source of the MOSFET is grounded, and a drain of the MOSFET is electronically connected to the power source, a node between the power source and the drain of the MOSFET is electronically connected to the power supply circuit; the controller control the switch of the MOSFET, to switch work modes of the power supply circuit accordingly.

6. The power control circuit of claim 1, further comprising a display electronically connected to the main controller, wherein the display displays the value of the output current, and the determination of the main controller.

7. The power control circuit of claim 6, further comprising a switch chip electronically connected to the main controller, the display and the current detection unit, wherein the switch chip selectively connects either the display or the current detection unit to the main controller under the control of the main controller.

8. A loop analyzing apparatus, comprising:
a power supply circuit;
a loop analyzer executing a loop test of the power supply circuit; and
a power control circuit controlling the power supply circuit to operate in a continuous conduction mode throughout the loop test, the power control circuit comprising:
a main controller;
a current detection unit electronically connected to the main controller, the current detection unit cooperating with the main controller in detecting a value of an output current of a power supply circuit; and
a mode switch unit electronically connected to the main controller;
wherein the main controller determines whether the power supply circuit is operating in a discontinuous conduction mode or a in continuous conduction mode according to the value of the output current of the power supply circuit, and controls the mode switch unit to switch the power supply circuit to the continuous conduction mode when the power supply circuit operates in the discontinuous conduction mode.

9. The loop analyzing apparatus of claim 8, wherein the main controller compares the value of the output current of the power supply circuit with a predetermined limited value, the main controller determines that the power supply circuit operates in the discontinuous conduction mode when the value of the output current is lower than the predetermined limited value; and the main controller determines that the power supply circuit operates in the continuous conduction mode when the value of the output current is higher than the predetermined limited value.

10. The loop analyzing apparatus of claim 9, wherein the power control circuit further comprises an input unit electronically connected to the main controller, the input unit inputs the predetermined limited value.

11. The loop analyzing apparatus of claim 8, wherein the current detection unit comprises a detection resistor electronically connected to an output terminal of the power supply circuit, and a voltage monitoring chip electronically connected to two terminals of the detection resistor, the voltage monitoring chip detects a value of a voltage across the detection resistor and outputs the value of the voltage cross the detection resistor to the main controller, the main controller calculates the value of the output current according to the capacitance of the detection resistor and the value of the voltage across the detection resistor.

12. The loop analyzing apparatus of claim 8, wherein the mode switch unit comprises a metal-oxide-semiconductor field-effect transistor (MOSFET) and a power source, a gate of the MOSFET is electronically connected to the main controller, a source of the MOSFET is grounded, and a drain of the MOSFET is electronically connected to the power source, a node between the power source and the drain of the MOSFET is electronically connected to the power supply circuit; the controller control the switch of the MOSFET, to switch work modes of the power supply circuit accordingly.

13. The loop analyzing apparatus of claim 8, wherein the power control circuit further comprises a display electronically connected to the main controller, the display displays the value of the output current, and the determination of the main controller.

14. The loop analyzing apparatus of claim 13, wherein the power control circuit further comprises a switch chip electronically connected to the main controller, the display and the current detection unit, the switch chip selectively connects either the display or the current detection unit to the main controller under the control of the main controller.

* * * * *